United States Patent
Diggs et al.

[11] Patent Number: 6,110,876
[45] Date of Patent: Aug. 29, 2000

[54] DRILLING COMPOSITIONS AND METHODS

[75] Inventors: David Diggs, Arlington; Marie Kearney, Brighton; M. J. Timm, Acton; E. C. Lupton, Boston; Lev Bromberg, Swampscott; Mara Stein, Woburn; Barry Hand, Acton; Michael Orkisz, Brighton, all of Mass.

[73] Assignee: Baroid Drilling Fluids, Inc., Houston, Tex.

[21] Appl. No.: 09/227,252

[22] Filed: Jan. 8, 1999

Related U.S. Application Data

[62] Division of application No. 08/570,623, Dec. 11, 1995, Pat. No. 5,888,943.
[60] Provisional application No. 60/000,724, Jun. 30, 1995, and provisional application No. 60/004,324, Sep. 26, 1995.

[51] Int. Cl.[7] .............................. C09K 7/00; E21B 21/00

[52] U.S. Cl. .......................... 507/921; 507/120; 507/219; 507/225; 507/925; 524/916

[58] Field of Search ..................................... 507/120, 219, 507/225, 925, 921; 524/916

[56] References Cited

U.S. PATENT DOCUMENTS

| | | | |
|---|---|---|---|
| 4,448,926 | 5/1984 | Lundberg et al. | 524/612 |
| 4,655,942 | 4/1987 | Dickert, Jr. et al. | 252/8.5 |
| 4,889,887 | 12/1989 | Fan et al. | 524/510 |
| 5,064,422 | 11/1991 | Wick | 604/307 |
| 5,270,382 | 12/1993 | Ahmed et al. | 524/809 |
| 5,278,203 | 1/1994 | Harms | 523/200 |
| 5,858,928 | 1/1999 | Aubert et al. | 507/128 |

*Primary Examiner*—Shean C. Wu
*Attorney, Agent, or Firm*—Choate, Hall & Stewart

[57] ABSTRACT

The materials include non-polyampholite crosslinked polymers and gels based on a polymer which in uncrosslinked form is substantially soluble in ionic fluids and substantially insoluble in water. The materials change their state of hydration in response to an environmental trigger. The disclosed materials are useful as drilling, completion or workover fluids in wells such as hydrocarbon producing wells. According to the disclosed method, crosslinked polymers or gels are introduced into a stratum, blocking or bridging the pores of the stratum. Thereafter, an environmental condition is changed to cause the hydrated material to become less hydrated to unblock the pores allowing production from the well.

15 Claims, 2 Drawing Sheets

DRILLING COMPOSITIONS AND METHODS

This is a divisional application of U.S. Ser. No. 08/570,623 filed Dec. 11, 1995 now U.S. Pat. No. 5,888,943, Mar. 30, 1999, entitled, "Drilling Compositions and Methods". This application claims benefit of provisional application Ser. No. 60/000,724 filed Jun. 30, 1995, and a provision of Ser. No. 60/004,324 filed Sep. 26, 1995.

BACKGROUND OF THE INVENTION

This invention relates to drilling compositions and methods, and more particularly to drilling compositions useful in hydrocarbon well drilling operations which change from a more hydrated condition to a less hydrated condition in response to a change in an environmental condition.

During drilling of a well such as a well for extracting hydrocarbons, fluids are pumped into the well. Different fluids are used during different stages of the drilling operation. At one stage, fluids known as workover and completion fluids are used. Such fluids serve several purposes such as cooling and lubricating the drill bit, and transporting solids to the surface. Another important function of the drilling fluid is to balance the hydrostatic pressures encountered as the well is drilled. A condition called "blow-out" will occur if the pressure in an underground formation is greater than that provided by the fluid. In order to balance the pressures encountered in deep wells, fluids denser than water are typically required. One technique for increasing density is to create a brine or saturated salt solution which increases density up to 18 pounds per gallon.

To assure that a blow-out does not occur, the well is drilled in an over-balanced state, the pressure of the drilling fluid being higher than that encountered in the formation. Such over-balanced drilling, however, will cause the drilling fluid to infiltrate into the stratum which will damage the formation and greatly impair the ability to recover material from the well once production begins. Therefore, in the prior art, drilling fluids often include solids known as bridging agents to serve as a barrier to prevent the drilling fluid from infiltrating into the formation pore spaces and thereby damaging the formation. One prior art technique is to suspend salt crystals in an already saturated salt or brine solution to bridge the formation pore spaces to prevent formation damage. See, U.S. Pat. Nos. 4,186,803; 3,785,438; 3,878,141; 4,175,042; 4,369,843; and 4,822,500. Prior art bridging agents temporarily bridge over the formation pores rather than permanently plugging the pores. These bridging agents are dissolved when the workover or completion operation is accomplished to allow production from the well. A suspension agent is required to suspend the salt crystals but prior art suspension agents such as xanthan gum work only in monovalent ion solutions such as sodium chloride and sodium bromide. Divalent ion solutions such as $CaCl_2$ and $CaBr_2$ have distinct advantages over the monovalent ion solutions, such as NaCl and NaBr. For example, a $CaCl_2$ solution can be made much denser than a NaCl solution while maintaining a solids-free fluid. Further, the $CaCl_2$ is substantially cheaper than the NaBr at the same densities. The use of $CaBr_2$ raises the maximum density to 14.3 lbs/gallon while maintaining a solids-free fluid. A drilling fluid that uses these brines as a base fluid has long been sought, but there has been no material that could be added that would have the necessary fluid-loss control and could be easily cleaned from the well.

SUMMARY OF THE INVENTION

The following terms are used herein and are defined as follows. A polymer is a long chain molecule with high molecular weight from a sizeable number of repeat units. A crosslinked polymer is a polymer which contains crosslinking units joining the primary backbones of the polymer. A gel is a crosslinked polymer which is swollen with a significant quantity of fluid.

The invention, in a first aspect, is a copolymer comprising a first monomer whose homopolymer is hydrophobic but soluble in ionic solutions and a second monomer whose homopolymer is hydrophilic tending to swell in water. In one embodiment, the first monomer is a nitrile containing compound having a double or triple bond capable of being polymerized and wherein the second monomer comprises acrylamides, substituted acrylamides or hydroxyacrylates having a double bond, triple bond or other functionality which can be polymerized. The first monomer may be selected from the group comprising acrylonitrile, methacrylonitrile, maleonitrile and fumaronitrile. The second monomer may be selected from the group comprising acrylamide, methyl acrylamide, dimethyl acrylamide, ethyl acrylamide, 2-hydroxyethyl acrylate, hydroxypropyl acrylate and hydroxyethylmethyl acrylate. A second monomer of the second type may be used to produce a terpolymer.

In another aspect, the invention is a non-polyampholite crosslinked polymer which polymer in uncrosslinked form is substantially soluble in ionic fluids and substantially insoluble in water. A polyampholite polymer is a polymer whose polymeric backbone contains, or pendant groups from the polymeric backbone contain (in either ionized or neutral form) in substantial mole percentage both anionic groups, such as carboxylic acid or sulfonic acid and cationic groups such as quaternary ammonium groups. A crosslinked polyampholite polymer is a polyampholite polymer which contains cross-linking joining the primary polymer backbones. A polyampholite gel is a crosslinked polyampholite polymer which is swollen with a significant quantity of fluid. We have determined that the polyampholite gels described in the prior art (X. Yu, Ph.D. Thesis submitted to the Department of Physics, Mass. Inst. of Tech. 1993, which is included herein by reference) would not be useful for this application because they are too swollen in pure water or in dilute salt solutions (they do not collapse sufficiently) and because, although they expand in more concentrated salt solution relative to more dilute solutions, the degree of expansion is relatively small. In one embodiment, the non-polyampholite crosslinked polymer includes a monomer which forms a hydrophobic homopolymer and a monomer which forms a hydrophilic homopolymer which polymer in uncrosslinked form will be substantially soluble in ionic fluids and substantially insoluble in water. In this embodiment, the crosslinked polymer includes a first monomer which is a nitrile containing compound having a double or triple bond capable of being polymerized and wherein the second monomer comprises acrylamides, substituted acrylamides or hydroxy acrylates having a double bond, triple bond or other functionality which can be polymerized.

In yet another aspect, the invention is a gel comprising a non-polyampholite crosslinked polymer which polymer in uncrosslinked form is substantially soluble in ionic fluids and substantially insoluble in water, the crosslinked polymer being hydrated with an ionic fluid. In one embodiment, this gel comprises a monomer which forms a hydrophobic homopolymer and a monomer which forms a hydrophilic homopolymer, the gel being hydrated with an ionic fluid. The monomer which forms a hydrophobic homopolymer may be a nitrile containing compound which contains a double or triple bond capable of being polymerized and wherein the hydrophilic monomer comprises acrylamides, substituted acrylamides or hydroxyacrylates having a double bond, triple bond or other functionality which can be polymerized. Suitable monomers are set forth above. The resulting material is soluble in ionic fluids such as calcium chloride but insoluble in water.

As used in this specification, an ionic fluid is an aqueous solution containing one or more of the following salts: NaCl, NaBr, $CaCl_2$, $CaBr_2$, $ZnCl_2$, $ZnBr_2$, RbCl, RbBr, CsCl, CsBr, Cs formate, Rb formate, K formate, Na formate, KBr, KCl, $NH_4Cl$, $NH_4Br$. A concentrated ionic fluid here is meant an ionic fluid which has a concentration greater than 6% dissolved salts by weight. An ionic fluid may, in addition, contain particulate material.

In one embodiment, the ionic fluid is a solution of a divalent cation such as calcium, magnesium or zinc. A suitable salt is selected from the group comprising calcium chloride and calcium bromide. In another embodiment, the aqueous salt solution is a solution of a monovalent cation. Suitable monovalent cationic systems are NaCl and NaBr. Other suitable cationic systems include zinc, magnesium and potassium. In a preferred embodiment, the gel includes a crosslinked polymer of a first nitrile containing monomer and a second monomer selected from the group comprising acrylamides, substituted acrylamides and hydroxyacrylates, the crosslinked polymer hydrated with an aqueous solution of calcium ions such as a solution of calcium chloride or calcium bromide. One suitable hydrated gel is selected to become dehydrated in water, in dilute sodium chloride or in potassium chloride. In yet another more general aspect of the invention, a crosslinked polymer hydrated with an ionic aqueous solution is selected to become less hydrated upon exposure to an environmental condition. Suitable environmental conditions are temperature, pH, solvent, solvent concentration, ions, ionic concentration, electric field, magnetic field and pressure. These hydrated gels are effective drilling fluids.

In yet another aspect, the invention is a method for blocking and unblocking pores of an underground stratum such as an oil-bearing formation. The method includes introducing a gel serving as a treating fluid in a drilling, well completion or workover operation into the stratum to block or bridge the pores and exposing the gel to an environmental condition selected to lower the state of hydration of the gel, whereby the gel decreases in volume and unblocks the pores. Suitable gels comprise a crosslinked polymer other than a polyampholite polymer which polymer in uncrosslinked form is substantially soluble in ionic fluids and substantially insoluble in water, the crosslinked polymer being hydrated with an ionic fluid.

In yet another aspect of the invention, a method for drilling, well completion or workover includes introducing a gel hydrated with an ionic fluid into a subterranean formation and thereafter exposing the gel to an environmental condition selected to lower the state of hydration of the gel, whereby the gel decreases in volume to increase permeability of the well. Suitable gels are those set forth above. Suitable ionic fluids are solutions of ions such as calcium, magnesium, sodium or zinc. Preferred solutions are solutions of calcium chloride, calcium bromide and zinc chloride. A suitable trigger for decreasing the state of hydration of the fluid is exposing the fluid to water, a dilute ammonium chloride solution or potassium chloride solution typically 3 wt. %.

The gels of the invention hydrated, for example, with calcium chloride, have a suitable density for preventing blow-out in a well. Further, the hydrated gel will block or bridge the pores in a formation without allowing substantial amounts of the fluid to penetrate into the formation which would damage it. Upon exposure to an environmental condition such as contact with water or a dilute sodium or potassium chloride solution, the gel becomes less hydrated and shrinks in volume to unblock the pores to allow fluids in the stratum to be produced. When the stratum is a hydrocarbon bearing formation, the hydrocarbon will flow into the well for recovery.

Because the fluids of the present invention are capable of utilizing calcium compounds, these fluids are more economical than monovalent ionic solutions such as sodium chloride and sodium bromide utilized in the prior art drilling fluids to increase density. Further, the materials of the invention are "clear" meaning that they do not include any solid materials such as calcium carbonate. It should also be noted that zinc chloride or zinc bromide, more expensive than calcium chloride or calcium bromide, can be used with the materials of the invention and allows for heavier fluids to be made for use in deeper wells where pressures are higher.

DESCRIPTION OF THE PREFERRED EMBODIMENTS

Figure 1:
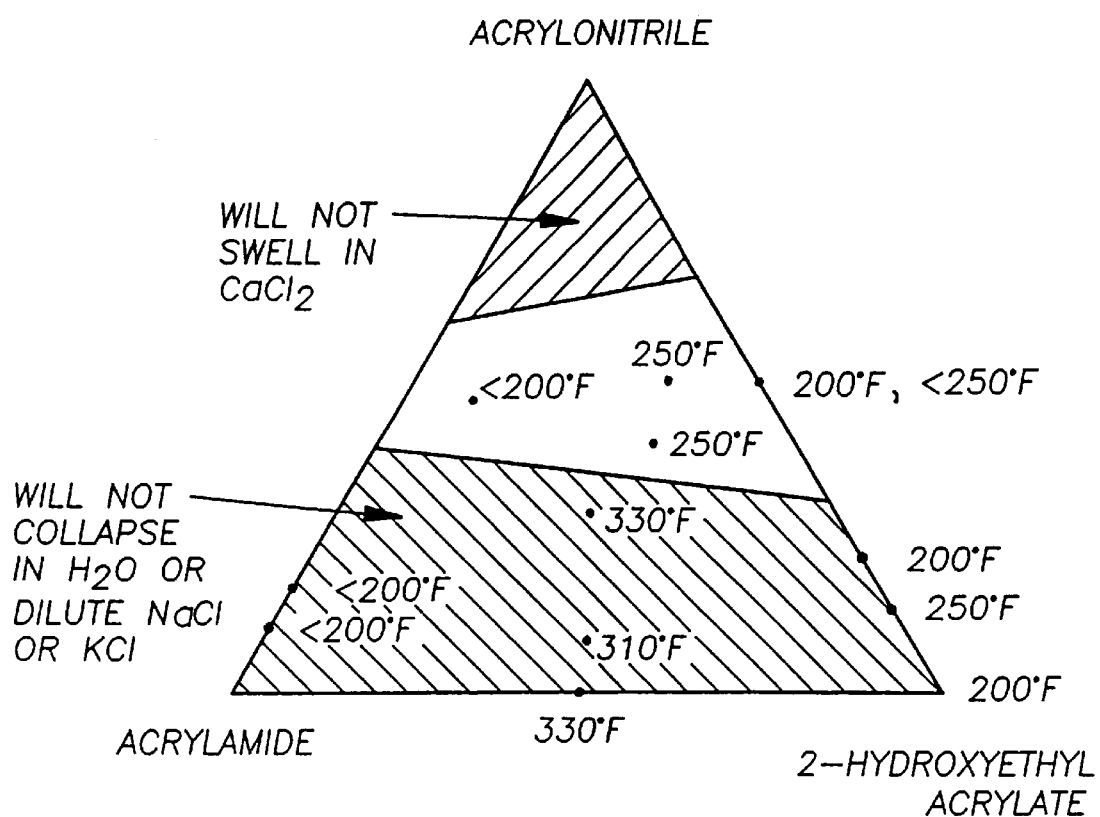
FIG. 1 is a phase diagram of the acrylonitrile, acrylamide, 2-hydroxy acrylate system.

The polymers, crosslinked polymers and gels of the invention, sometimes referred to as Engineered Response™ materials, reversibly undergo a change from primarily hydrophilic to primarily hydrophobic in response to an environmental condition or trigger such as temperature, pH, solvent (such as hydrocarbons), solvent concentration, ions or ionic concentration, electric fields, magnetic fields or pressure. Materials and gels which exhibit such changes are known in the art. See, for example, Tanaka, *Physical Review Letters*, Vol. 40, No. 12, pp. 820–823 (1978); Tanaka, *Physical Review Letters*, Vol. 38, No. 14, pp. 771–774 (1978); Tanaka et al., *Physical Review Letters* 5, Vol. 45, p. 1636 (1980); Ilavsky, *Macromolecules*, Vol. 15, p. 782 (1982); Hrouz et al., *Europ. Polymer J.*, Vol. 17, p. 361 (1981); Ohmine et al., *J. Chem. Phys.*, Vol. 8, p. 6379 (1984); Tanaka et al., *Science*, Vol. 218, p. 462 (1982); Ilavsky et al., *Polymer Bull.*, Vol. 7, p. 107 (1982); Gehrke, *Responsive Gels: Volume Transitions II*; ed. K. Dusek, Springer-Verlag, New York, pp. 81–114 (1993); Li et al., *Ann. Rev. Mat. Sci.*, 22; 243–277 (1992); Galaev et al., *Enzyme Microb. Technol.*, 15, 354–366 (1993); Taylor et al., *J. Polymer Sci.*, Vol. 13, 2551–2570 (1975); U.S. Pat. No. RE35,068; and U.S. patent application Ser. No. 08/393,971 filed Feb. 24, 1995, entitled "Electromagnetically Triggered Responsive Gel Based Drug Delivery Device", all of which are incorporated herein by reference. The change from hydrophilic to hydrophobic character may be evidenced by a decrease in transmission of light (cloud point), change in viscosity or swelling or collapse. If a responsive polymer undergoes change in response to a change in temperature, it is a "thermally responsive polymer" or a "temperature responsive polymer." If the responsive polymer undergoes the change in response to a change in pH, it is a "pH responsive polymer." The change in environmental condition which causes the hydrophobic/hydrophilic change is called a "trigger." When an engineered response polymer or a "responsive polymer" is crosslinked to form a gel, the resulting material is designated an engineered response gel or a "responsive gel."

In one important aspect of the invention, the properties of engineered response or phase transition gels and/or polymers form a system in which the gels and/or polymers will swell and block or bridge the pores of an underground hydrocarbon bearing stratum structure and then be triggered to change the state of hydration (solvation) of the gel or polymer to unblock the pores. A suitable trigger is the ionic strength of fluid to which the gel is exposed. Suitable materials will expand in a high concentration of ions (high ionic strength) and collapse in a lower concentration of ions (lower ionic strength). An example is a material which will swell in the presence of concentrated calcium ions, such as are found in concentrated solutions of calcium chloride and/or calcium bromide ($CaCl_2$ or CaBr) and collapse in the presence of water or of a dilute solution of ions such as a solution of ammonium chloride or potassium chloride ($NH_4Cl$ or KCl).

The responsive gels or polymers of the invention are made by creating a copolymer or terpolymer which will have the necessary responsive properties. The materials of the invention may be made from a first monomer whose homopolymer is hydrophobic (tends to collapse in water), but which will tend to wet, dissolve and/or expand in ionic solutions, particularly solutions of ions such as calcium, magnesium and zinc. Examples of such monomers are acrylonitrile, methacrylonitrile, maleonitrile, fumaronitrile or other nitrile containing monomers which contain a double or triple bond which can be polymerized.

A second monomer is one whose homopolymer is hydrophilic and will cause the gel or polymer to tend to swell in water giving it the pore bridging capability and necessary swelling capability in calcium chloride solution. Examples of suitable second monomers are acrylamides and substituted acrylamides, such as acrylamide, methyl acrylamide, dimethyl acrylamide and ethyl acrylamide, and hydroxyacrylates such as 2-hydroxyethyl acrylate, hydroxypropyl acrylate and hydroxyethylmethyl acrylate. All of these materials contain a double bond, triple bond or other functionality which can be polymerized.

The design of a polymer or gel useful in the present invention involves synthesizing a material which is a copolymer or terpolymer of the first monomer type and one or more monomers of the second monomer type so that the hydrophobic and hydrophilic tendencies are balanced and the material will swell in concentrated calcium chloride or calcium bromide solution and collapse in water or in dilute sodium chloride or potassium chloride solution. It is possible to synthesize the materials of the invention utilizing one monomer of the first type as listed above and allowing all or part of this monomer to react to form a material of the second monomer type. An example is the reaction of acrylonitrile with water to hydrolyze and form acrylamide. It is also contemplated that the monomers of the first and second type will comprise a block or graft copolymer form so that the arrangement of the first monomer and second monomer in the polymer or gel is not random.

EXAMPLES

EXAMPLE 1

Synthesis of Acrylonitrile /2-Hydroxyethyl Acrylate Gels in $CaBr_2/ZnCl_2$.

650 grams of calcium bromide hydrate (Aldrich, 98%) is added to 500 ml of DI (deionized) water and allowed to dissolve. 90 ml of this solution is placed in an Erlenmeyer flask. 1583 grams of zinc chloride (Aldrich, 98%, A.C.S. reagent) is added to 500 ml of DI water and allowed to dissolve. Ten ml of this solution is added to the 90 ml of $CaBr_2$ solution in the Erlenmeyer. 3.6956 grams (4.59 ml) of acrylonitrile (Aldrich, 99%), 8.0878 grams (8.00 ml) of 2-hydroxyethyl acrylate (Aldrich, 96%) and 0.1498 grams (0.144 ml) of diethylene glycol diacrylate (Monomer-Polymer & Dajac Laboratories, Catalogue No. 7945) are added to the 100 ml of $CaBr_2/ZnCl_2$ solution. The flask is sealed with a rubber stopper and $N_2$ is bubbled through the solution for 30 minutes. In a 20 dram glass vial, 0.144 grams of VA-086 (Wako Chemicals USA, Inc.) is added to 10 ml of DI water and allowed to dissolve. The VA-086 serves as an initiator. Using a syringe, 5 ml of the VA-086 solution is added to the flask containing the reactants. The flask is swirled until well mixed and placed in an oven at 80° C. overnight to allow the gel to form.

EXAMPLE 2

Synthesis of Acrylonitrile/2-Hydroxyethyl Acrylate Gels in $CaBr_2$.

650 grams of calcium bromide hydrate (Aldrich, 98%) is added to 500 ml of DI water and allowed to dissolve. 100 ml of this solution is placed in an Erlenmeyer flask. 3.6956 grams (4.59 ml) of acrylonitrile (Aldrich, 99%), 8.0878 grams (8.00 ml) of 2-hydroxyethyl acrylate (Aldrich, 96%), and 0.1498 grams (0.144 ml) of diethylene glycol diacrylate (Monomer-Polymer & Dajac Laboratories, Catalogue No. 7945) are added to the 100 ml of $CaBr_2$ solution. The flask is sealed with a rubber stopper and $N_2$ is bubbled through the solution for 30 minutes. In a 20 dram glass vial, 0.144 grams of VA-086 is added to 10 ml of DI water and allowed to dissolve. Using a syringe, 5 ml of the VA-086 solution is added to the flask containing the reactants. The flask is swirled until well mixed and placed in an oven at 80° C. overnight to allow the gel to form.

EXAMPLE 3

Synthesis of Acrylonitrile/Acrylamide/2-Hydroxyethyl Acrylate Gels 650 grams of calcium bromide hydrate (Aldrich, 98%) is added to 500 ml of DI water and allowed to dissolve. 100 ml of this solution is placed in an Erlenmeyer flask. 2.9565 grams (3.67 ml) of acrylonitrile (Aldrich, 99%), 1.9803 grams of acrylamide (Aldrich, 99%), 6.4702 grams (6.40 ml) of 2-hydroxyethyl acrylate (Aldrich, 96%), and 0.1498 grams (0.144 ml) of diethylene glycol diacrylate (Monomer-Polymer & Dajac Laboratories, Catalogue No. 7945) are added to the 100 ml of $CaBr_2$ solution. Heat may be necessary to dissolve the acrylamide in the $CaBr_2$ solution. The flask is sealed with a rubber stopper and $N_2$ is bubbled through the solution for 30 minutes. In a 20 dram glass vial, 0.144 grams of VA-086 is added to 10 ml of DI water and allowed to dissolve. Using a syringe, 5 ml of the VA-086 solution is added to the flask containing the reactants. The flask is swirled until well mixed and placed in an oven at 80° C. overnight to allow the gel to form.

EXAMPLE 4

Testing of Acrylonitrile/2-Hydroxyethyl Acrylate Gels 400 grams of $CaCl_2$ (Aldrich Catalogue No. 22,231-3) is added to 600 ml of DI water and allowed to dissolve and cool. The terpolymer gel synthesized in Example 2 is removed from the flask and added to 400 ml of the $CaCl_2$ solution. The mixture is allowed to swell for 24 hours and then homogenized (Arde-Barinco Inc., CJ-4 16" Laboratory Mixer) for 5 minutes on the "up" mode at 40% motor RPM. Using the Permeability Plugging Apparatus (PPA, Fann Instrument Company, Part No. 382020001) the gel mixture is tested using a 10 μm ceramic filter. The test consists of adding approximately 300 ml of the mixture to the cell unit, sealing the cell, placing it into the heating jacket, applying 100 psi of back pressure using $N_2$, heating to the desired testing temperature, and applying 500 psi of hydraulic pressure (procedure for testing found in the Fann PPA manual). The amount of filtrate that penetrates through the ceramic disc in 30 minutes is the test result. The test showed 18 ml over the required 30 minutes at a temperature of 200° F. Using the same disc, the cell is further heated to 250° F. and 45 ml of filtrate penetrated in 2 minutes.

EXAMPLE 5

Testing of Acrylonitrile/Acrylamide/2-Hydroxyethyl Acrylate Gels 400 grams of $CaCl_2$ (Aldrich Catalogue No. 22,231-3) is added to 600 ml of DI water and allowed to dissolve and cool. The terpolymer gel synthesized in Example 2 is removed from the flask and added to 400 ml of the $CaCl_2$ solution. The mixture is allowed to swell for 24 hours and then homogenized (Arde-Barinco Inc., CJ-4 16" Laboratory Mixer) for 5 minutes on the "up" mode at 40% motor RPM. Using the Permeability Plugging Apparatus (PPA, Fann Instrument Company, Part No. 382020001) the gel mixture is tested using a 10 μm ceramic filter. The test consists of adding approximately 300 ml of the mixture to the cell unit, sealing the cell, placing it into the heating jacket, applying 100 psi of back pressure using $N_2$, heating to the desired testing temperature, and applying 500 psi of hydraulic pressure (procedure for testing found in the Fann PPA manual). The amount of filtrate that penetrates through the ceramic disc in 30 minutes is the test result. The test showed 15 ml over the required 30 minutes at a temperature of 200° F. Using the same disc, the cell is further heated to 250° F. and 6 ml of filtrate penetrated in 30 minutes. At 300° F., 11 ml of filtrate penetrated in 10 minutes. To test reversibility of the material, the material is tested on an API filter press (Fann Instrument Company, Part No. 30200). Approximately 200 ml of mixture is placed in the cell and a pressure of 100 psi is applied, using $N_2$ gas, for ten minutes to assure that a block is achieved with a ten micron disc. The excess mixture is then removed and approximately 300 ml of 3% potassium chloride (also may use 3% ammonium chloride) is added. The amount of filtrate that penetrates through the disc in a designated time frame is the reverse test result. The test showed 150 ml of filtrate over 6 minutes.

EXAMPLE 6

Synthesis of Acrylonitrile/Acrylamide/2-Hydroxyethyl Acrylate Gels 250 ml of a warm 14.2 lbs/gallon Calcium Bromide solution (Baroid Drilling Fluids) is placed in an Erlenmeyer flask. 4.938 grams of acrylamide (Aldrich, 99%) is allowed to dissolve. This solution is then placed in a sep funnel and 7.7457 grams (9.61 ml) of acrylonitrile (Aldrich, 99%), 16.135 grams (15.96 ml) of 2-hydroxyethyl acrylate (Aldrich, 96%), and 0.5618 grams (0.540 ml) of diethylene glycol diacrylate (Monomer-Polymer & Dajac Laboratories, Catalogue No. 7945) are added. $N_2$ is bubbled through the solution for 30 minutes. In a 40 dram glass vial, 0.378 grams of V-50 Azo initiator (Wako Chemicals USA, Inc.) is added to 28 ml of DI water and allowed to dissolve. 12.5 ml of the V-50 solution is then added to the calcium bromide solution and the solution is degassed for an additional 15 minutes. In a 500 ml baffled three necked reaction vessel, 400 ml of Norpar-12 (Exxon), with 0.75 g of Span 80 (sorbitan monooleate, ICI Americas, Inc.), is degassed for 45 minutes, while the norpar is being stirred with a six bladed R100 impeller, at 560 RPM. The calcium bromide solution is then added to the norpar solution, which is still being stirred, and the reaction runs for 15–18 hours, at approximately 70° C.

EXAMPLE 7

Testing of Acrylonitrile/Acrylamide/2-Hydroxyethyl Acrylate Gels

The terpolymer beads synthesized in Example 6 are removed from the suspension vessel and centrifuged at ¾ speed on a IEC HN-SII centrifuge for 30 minutes. The norpar is decanted off and the beads removed. Approximately 190 g of beads are added to 556 g of the $CaCl_2$ solution (11.6 lbs/gallon from Baroid Drilling Fluids, Inc.). The mixture is allowed to swell for 16 hours, stirring with an A-310 impeller at 500–600 rpm. Using the Permeability Plugging Apparatus (PPA, Fann Instrument Company, Part No. 382020001) the gel mixture is tested using a 10 μm ceramic filter. The test consists of adding approximately 350 ml of the mixture to the cell unit, sealing the cell, placing it into the heating jacket, applying 100 psi of back pressure using $N_2$, heating to the desired testing temperature, and applying 500 psi of hydraulic pressure (procedure for testing found in the Fann PPA manual). The amount of filtrate that penetrates through the ceramic disc in 30 minutes is the test result. The test showed 2.5 ml over the required 30 minutes at a temperature of 250° F.

To test reversibility of this material, it is diluted with DI water, using a 1:5 ratio. The material dehydrates, turning white. The collapsed material no longer is suspended in solution.

When zinc chloride ($ZnCl_2$) solution alone is present, the homopolymer polyacrylonitrile (PAN) demonstrates the desired properties of blocking a porus medium and then dehydrating in water. It is noted that PAN is soluble in $ZnCl_2$ but not in water. The PAN gel prevented $ZnCl_2$ solution from passing through a filter by effectively blocking the pores of the filter. When water was added, the gel collapsed, unblocking the pores and allowed water to pass through the filter.

There are, however, cost, corrosivity and environmental concerns connected with zinc chloride solutions. A drilling solvent which addressed these concerns is a solution of $CaCl_2$ and $CaBr_2$ in water. We have observed that the homopolymer PAN is not soluble in either of these. If enough $ZnCl_2$ is added to the solvent, PAN will become soluble as shown in Example 1. To eliminate the need for zinc, a copolymer of acrylonitrile was synthesized and tested. If the correct comonomer is chosen, the solubility of the copolymer in the $CaCl_2$ or $CaBr_2$ solution is achieved while preserving the lack of solubility of the copolymer in water. See examples 2 and 4 above. This property has been demonstrated with acrylamide, 2-hydroxyethyl acrylate, hydroxypropyl acrylate, hydroxyethylmethyl acrylate, and dimethyl acrylamide. Any hydrophilic monomer of which the polymer is soluble in $CaCl_2$ or $CaBr_2$ would be suitable if synthesized in correct ratio with the acrylonitrile and if the resulting polymer has a necessary performance and is thermally stable and otherwise suitable for use in the intended application.

It has been found that the desired performance can be achieved and enhanced by adding a third monomer to the polymer backbone to form a terpolymer. This often increases operating temperature range while preserving the reversing capability of the material. A terpolymer may be synthesized out of two monomers of the second type discussed above and one monomer of the first type listed above and would have the desired properties. The acrylonitrile provides the reversibility in water or low ionic strength solvents (3 wt % KCl), while the other monomers supply the solubility in $CaCl_2$ or $CaBr_2$ for example. There is no reason to believe that it would not be possible to add more hydrophilic monomers to polymerize with acrylonitrile to achieve the desired effects. See, examples 3 and 5.

From the experiments set forth above, certain conclusions can be drawn. The hydration state of the polymer has a direct effect on its filtration properties which are important in preventing damage to an oil-bearing formation, for example. Therefore, if one can control the hydration state of the gel, one can control the filtration properties of the gel. The hydration properties of the gel can be modified by copolymerizing monomers with different hydrophobic/hydrophilic characteristics. By adjusting the ratio of the monomers, one can radically affect the solubility in related solvents like water and concentrated salt solutions. The materials of the invention enable the use of $CaCl_2/CaBr_2$ in production zone drilling.

The materials of the invention can also be made by modifying an acrylonitrile gel. By hydrolyzing portions of an acrylonitrile gel one can achieve the same effect as copolymerizing the two monomers together. The copolymerization is simpler on the lab scale but a post-treatment on the commercial scale may be more economical. As discussed above, a suitable trigger to remove the blocking material will be water or another solution in which the gel has been designed to collapse such as dilute sodium chloride or potassium chloride.

The phase diagram of FIG. 1 delineates some conclusions in the acrylonitrile, acrylamide, 2-hydroxyethyl acrylate (AN/AAm/HEA) system. The phase diagram of FIG. 1 is exemplary only in illustrating a way of selecting proportions of the monomers in making a suitable terpolymer. The section near the top vertex represents a region in which the gels do not swell in calcium chloride. The lower segment which contains the AAm and HEA vertices represents the region in which the gels will not collapse in water or dilute saline. The numerical values in FIG. 1 represent maximum measured Fahrenheit temperature at which the gel will hold back fluid in testing. In FIG. 1, optimal materials illustrated by the phase diagram are in the range of 40% AN/20% AAm/40% HEA and 50% AN/10% AAm/40% HEA. Suitable compositions are between 35% and 55% AN, between 5% and 25% AAm and between 30% and 50% HEA. The characteristics of a number of gel combinations are shown in Table 1.

TABLE 1

| Sample No. | AN/AMIDE/HEA Ratio | Syn. Solvent | Pressure/Temp | ml/min | Reversibility |
|---|---|---|---|---|---|
| 1 | 0/0/100 | water | 500, 200° F. | 48 ml/30 min. | does not reverse |
| 2 | 10/0/90 | water | 500, 250° F. | .8 ml/10 min. | does not reverse |
| 3 | 15/0/85 | | 500, 200° F. | 21.5 ml/30 min. | does not reverse |
| 4 | 50/0/50 | $CaBr_2$ | 500, 200° F. | 18 ml/30 min. | |
| | " | | 500, 250° F. | 45 ml/30 min. | |
| 5 | 0/50/50 | water | 500, 200° F. | 12 ml/30 min. | does not reverse |
| | " | | 500, 250° F. | 6 ml/30 min. | |
| | " | | 500, 330° F. | 50 ml/5 min. | |
| 6 | 10/90/0 | water | 500, 200° F. | 97 ml/4 min. | does not reverse |
| 7 | 15/85/0 | water | 500, 200° F. | 88 ml/4 min. | does not reverse |
| 8 | 10/45/45 | water | 500, 200° F. | 8 ml/30 min. | does not reverse |
| | " | | 500, 250° F. | .8 ml/10 min. | |
| | " | | 500, 300° F. | 2.7 ml/10 min. | |
| | " | | 500, 330° F. | 7.5 ml/10 min. | |
| 9 | 50/10/40 (.5% XL) | $CaBr_2$ | 500, 200° F. | 10 ml/30 min. | |
| | " | | 500, 250° F. | 25 ml/10 min. | |
| 10 | 50/10/40 (1% XL) | $CaBr_2$ | 500, 200° F. | 49 ml/30 min. | |
| 11 | 50/40/10 | $CaBr_2$ | 500, 200° F. | did not test | viscous liquid |

TABLE 1-continued

| Sample No. | AN/AMIDE/HEA Ratio | Syn. Solvent | Pressure/Temp | ml/min | Reversibility |
|---|---|---|---|---|---|
| 12 | 50/25/25 | CaBr$_2$ | 500, 200° F. | failed at 200° F. | |
| 13 | 40/20/40 (hom 5 min.) | CaBr$_2$ | 500, 200° F. | 15 ml/30 min. | reverses |
| | 40/20/40 (hom 5 min.) | | 500, 250° F. | 6 ml/30 min. | |
| | 40/20/40 (hom 5 min.) | | 500, 300° F. | 11 ml/10 min. | |
| 14 | 40/20/40 (ho, 1 hr.) | CaBr$_2$ | 500, 200° F. | 59 ml/10 min. | |
| 15 | 33/33/33 | CaBr$_2$ | 500, 200° F. | 20 ml/30 min. | appears not reversible |
| | | | 500, 250° F. | 6 ml/30 min. | |
| | | | 500, 310° F. | 6 ml/10 min. | |
| | *all gels made in water | were homog. | 1 hour* | | |
| | *all gels made in water | were homog. | 5 min., unless | Noted* | |

Figure 2:
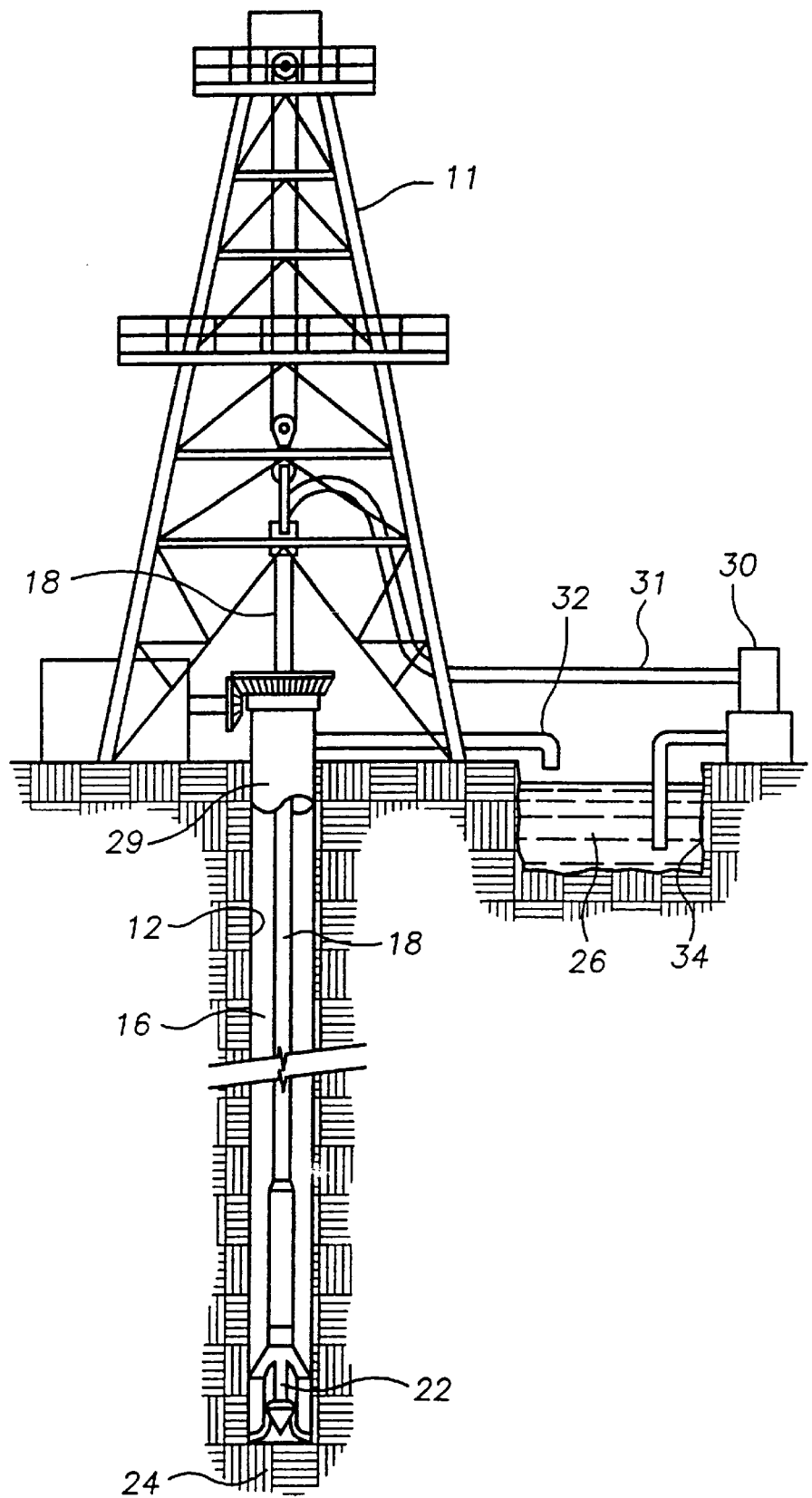
FIG. 2 is a cross-sectional view of a drilling rig and well.

The well drilling methods of the invention are illustrated in FIG. 2. In FIG. 2, drilling rig 11 is disposed on top of a borehole 12. An annulus 16 is created between the borehole 12 and drill string 18. A drill bit 22 is disposed at the lower end of drill string 18 and carves the borehole 12 out of earth formations 24. A metal surface casing 29 is positioned in the bore hole 12 above the drill bit 22 for maintaining the integrity of the borehole 12 near the surface. The fluids 26 of the invention may be kept in a mud pit 34 and pumped by a pumping system 30 through a conduit 31 into the central axial passageway of the drill string 18. The fluid 26 exits the drill string 18 at the drill bit 22 and travels back up the annulus 16. The material then flows through a conduit 32 into the mud pit 34.

As discussed above, the fluid 26 will bridge pores in the earth formation 24 to prevent formation damage. When desired, a substance such as water or an aqueous solution of sodium chloride or potassium chloride is pumped out of the mud pit 34, through the drill string 18 and out through the bit 22 into the annulus 16 to lower the state of hydration of the polymer or crosslinked polymer fluid 26 so that it decreases in volume to remove the bridge and seal from the formation 24 to allow the flow of fluids from the formation into the borehole 12.

It is intended that all variations and modifications of the inventions set forth above be included within the scope of the appended claims.

What is claimed is:

1. A gel hydrated with an ionic fluid comprising a crosslinked polymer selected from the group consisting of a neutral polymer; an anionic polymer; a cationic polymer; and a polymer, other than a polyampholite polymer containing both anionic and cationic groups, said crosslinked polymer being a polymer of a type which in uncrosslinked form is substantially soluble in ionic fluids and substantially insoluble in water.

2. The gel of claim 1 wherein said crosslinked polymer comprises a first monomer of a type which forms a hydrophobic homopolymer and a second monomer of a type which forms a hydrophilic homopolymer, said crosslinked polymer being a polymer of a type which in uncrosslinked form is substantially soluble in ionic fluids and substantially insoluble in water, the crosslinked polymer being hydrated with an ionic fluid.

3. The gel of claim 2 further comprising a third monomer of a type which forms a hydrophilic homopolymer, said third monomer being different from said second monomer.

4. The gel of claim 1 in which the ionic fluid comprises concentrated ionic fluid.

5. A gel selected from the group consisting of a neutral polymer; an anionic polymer; a cationic polymer: and a polymer; other than a polyampholite polymer, containing both anionic and cationic groups, said polymer comprising a first monomer of a type which forms a hydrophobic homopolymer and a second monomer of a type which forms a hydrophilic homopolymer, wherein the first monomer comprises a nitrile containing compound which contains a double or triple bond capable of being polymerized and wherein the second monomer comprises acrylamides, substituted acrylamides or hydroxyacrylates having a double bond, triple bond or other functionality which can be polymerized, said polymer being of a type which in uncrosslinked form is substantially soluble in ionic fluids and substantially insoluble in water.

6. The gel of claim 5 wherein the first monomer is selected from the group consisting of acrylonitrile, methacrylonitrile, maleonitrile and fumaronitrile.

7. The gel of claim 5 wherein the second monomer is selected from the group consisting of acrylamide, methylacrylamide, dimethyl acrylamide, ethyl acrylamide, 2-hydroxyethyl acrylate, 2-hydroxypropyl acrylate, and 2-hydroxyethylmethyl acrylate.

8. The gel of claim 1 wherein the ionic fluid comprises one or more divalent ions.

9. The gel of claim 1 wherein the ionic fluid comprises calcium, magnesium or zinc ions.

10. The gel of claim 1 wherein the ionic fluid comprises calcium chloride or calcium bromide.

11. The gel of claim 1 adapted to collapse (become dehydrated) upon exposure to an environmental condition.

12. The gel of claim 11 wherein the environmental condition is selected from the group comprising temperature, pH, solvent, solvent concentration, ions, ionic concentration, electric field, magnetic field and pressure.

13. The gel of claim 11 in which the environmental condition is exposure to water or a dilute ionic fluid.

14. The gel of claim 11 in which the environmental condition is exposure to water, dilute sodium chloride, dilute potassium chloride or dilute ammonium chloride.

15. A gel comprising a polymer comprising approximately 35% to 55% of a first monomer of a type which forms a hydrophobic homopolymer, approximately 5% to 25% of a second monomer of a type which forms a hydrophilic homopolymer and approximately 30% to 50% of a third monomer of a type which forms a hydrophilic homopolymer, said third monomer being different from said second monomer, said gel being hydrated with an ionic fluid.

* * * * *